LE ROY B. CARRIS.
SPRING WHEEL.
APPLICATION FILED OCT. 17, 1917.
1,285,559.
Patented Nov. 19, 1918.
4 SHEETS—SHEET 1.
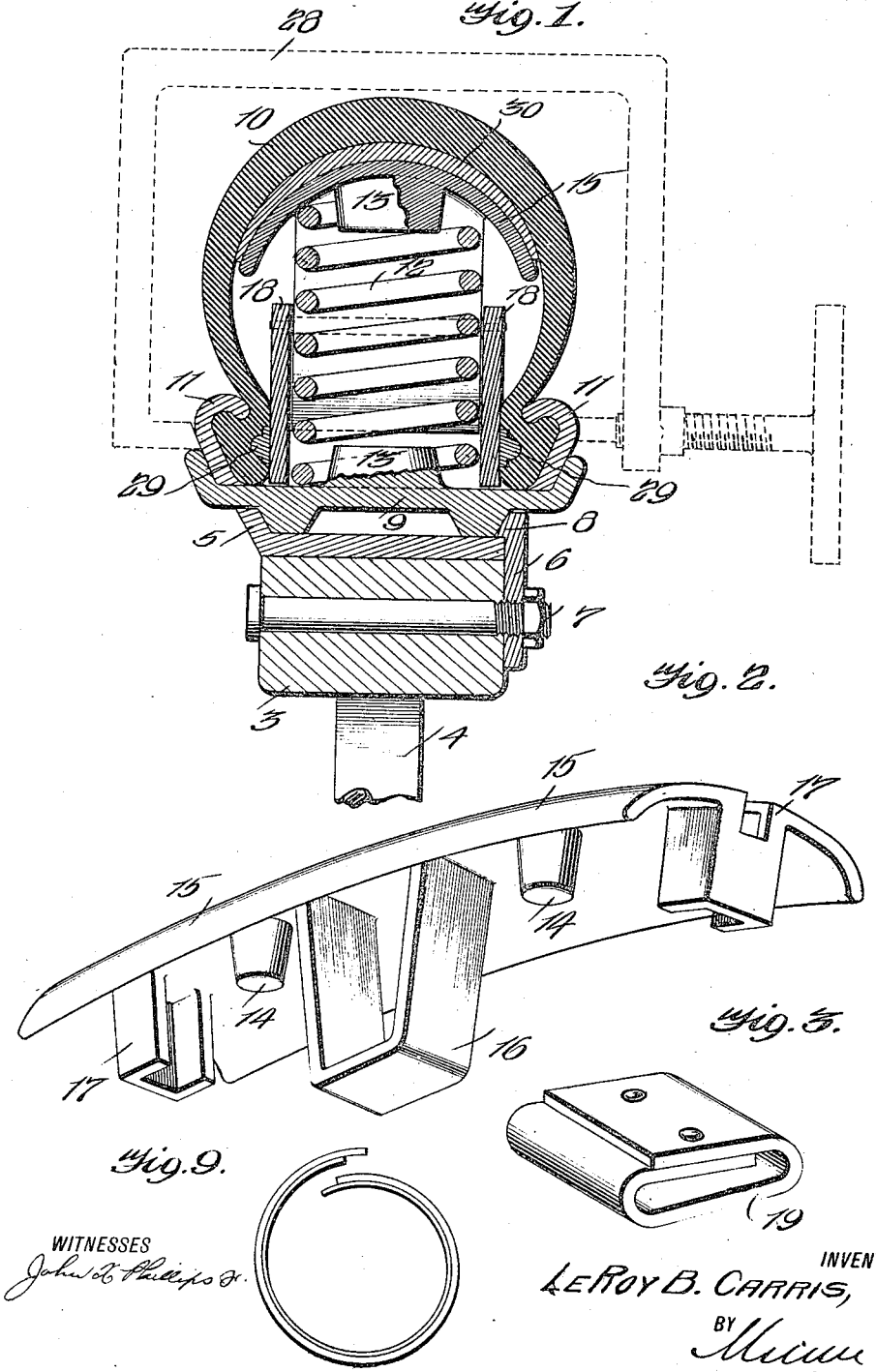
WITNESSES
INVENTOR
LeRoy B. Carris,
BY
ATTORNEYS

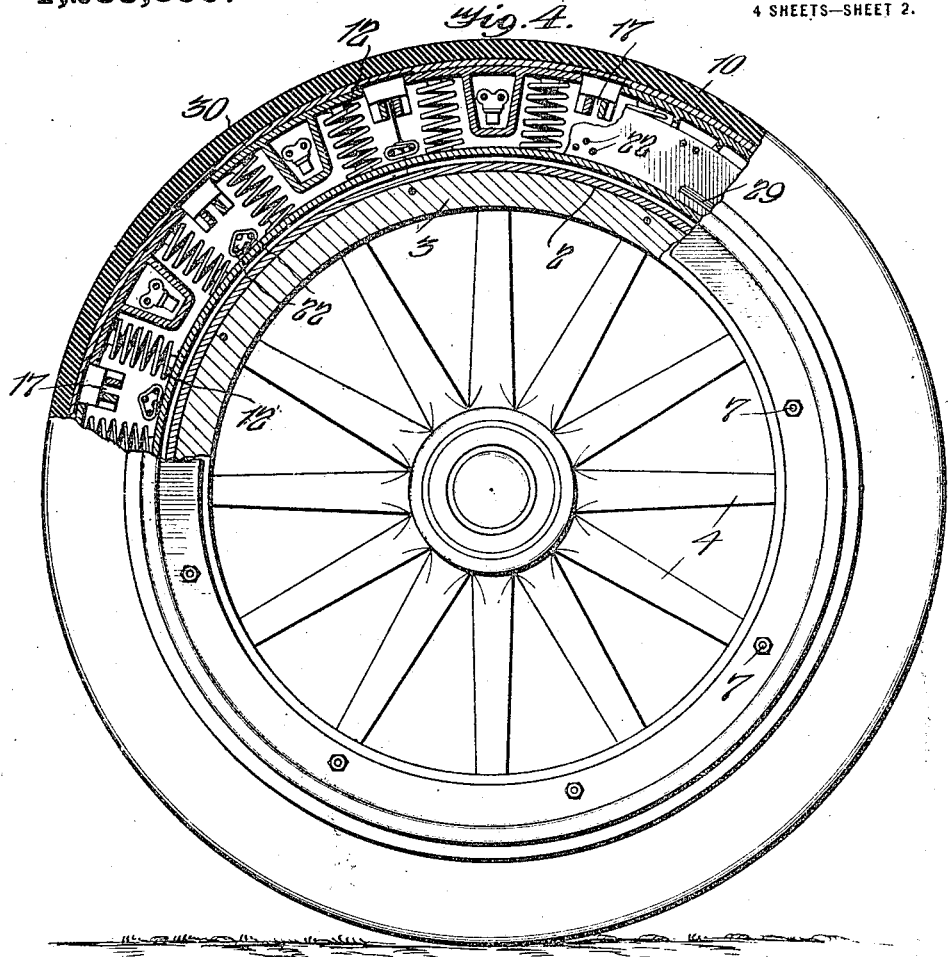
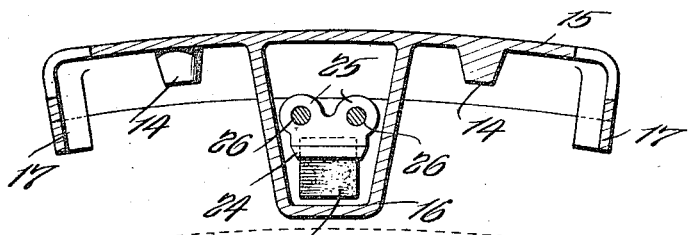

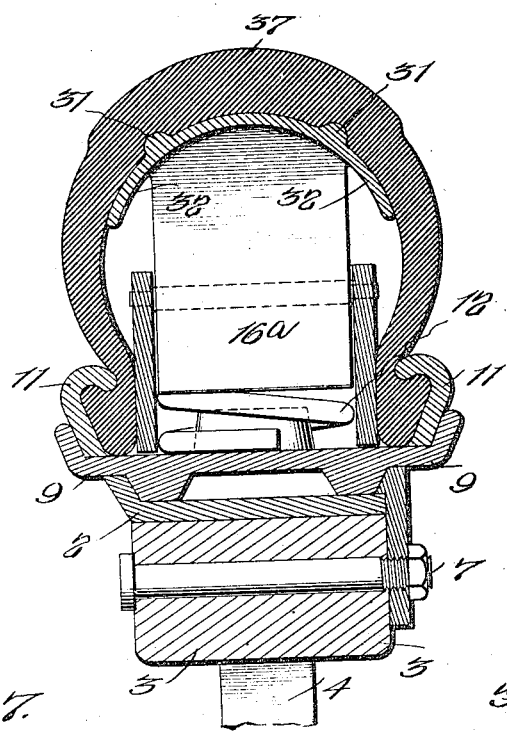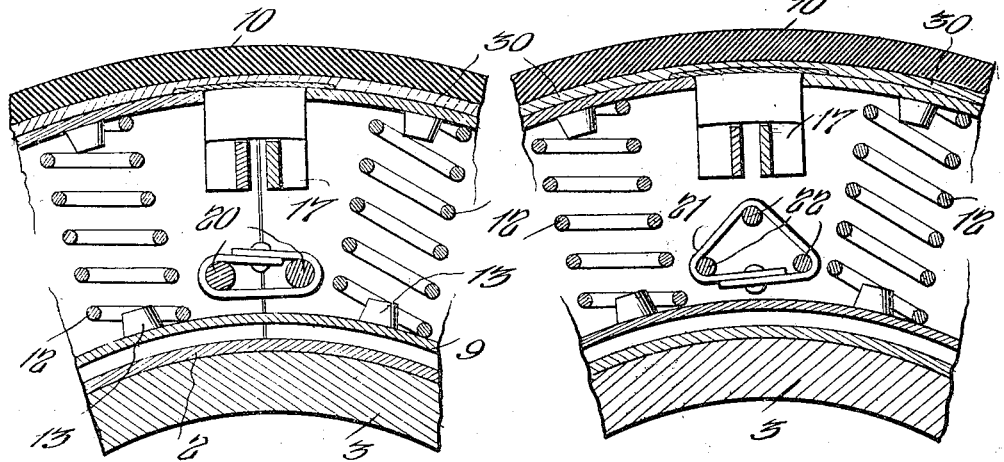

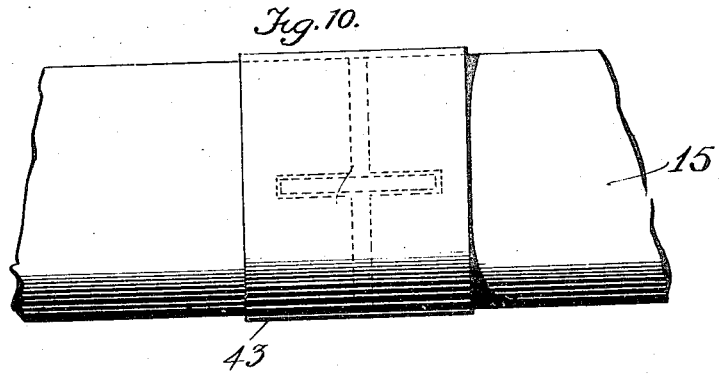
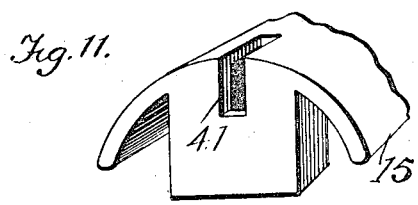
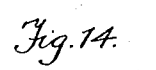
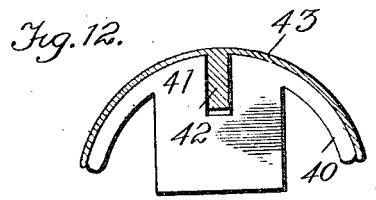
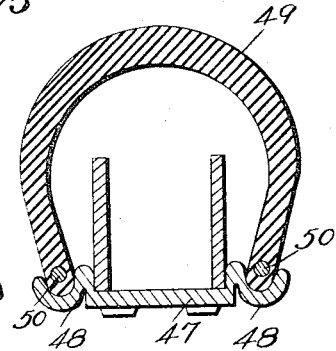
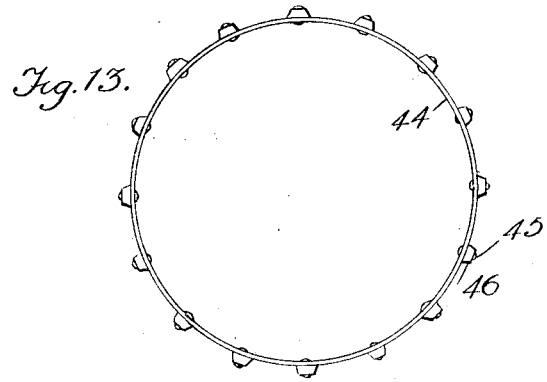

UNITED STATES PATENT OFFICE.

LE ROY B. CARRIS, OF SIOUX RAPIDS, IOWA.

SPRING-WHEEL.

1,285,559.

Specification of Letters Patent.

Patented Nov. 19, 1918.

Application filed October 17, 1917. Serial No. 197,037.

*To all whom it may concern:*

Be it known that I, LE ROY B. CARRIS, a citizen of the United States, and a resident of Sioux Rapids, in the county of Buena Vista and State of Iowa, have invented new and useful Improvements in Spring-Wheels, of which the following is a specification.

My invention is an improvement in spring wheels, and has for its object to provide a wheel of the character specified, wherein mechanism is provided for imparting to the wheel the resiliency of the pneumatic tire without the consequent cost of the said tire, and wherein a puncture-proof construction is obtained.

In the drawings:

Figure 1 is a radial section through the tire of the improved wheel;

Fig. 2 is a perspective view of one of the shoes;

Fig. 3 is a similar view of one of the connectors.

Fig. 4 is a side view of the improved wheel, with parts in section;

Fig. 5 is a longitudinal section through one of the shoes and the adjacent buffer.

Fig. 6 is a radial section showing a modified construction;

Figs. 7 and 8 are enlarged details of the sectional part of Fig. 4;

Fig. 9 is a side view of the split rim;

Fig. 10 is a top plan view showing a method of connecting the abutting ends of the shoes to prevent lateral movement;

Fig. 11 is a partial end view of one of the shoes;

Fig. 12 is a transverse vertical section, with the holding plate in place;

Fig. 13 is a side view of a method of securing the holding lugs separately from the rim.

Fig. 14 is a transverse section through a modified form of rim and casing.

The present embodiment of the invention comprises an inner wheel composed, as shown, of a hub 1, a metal rim 2, a wooden rim or felly 3 arranged within the metal rim and connected with the hub by means of spokes 4. The metal rim 2, as shown more particularly in Fig. 1, has at one side edge an upstanding flange 5 and at the other a retaining ring 6 is provided for holding the split rim, to be later described, in place, the said ring being secured to the felly by means of bolts and nuts 7. This ring, as shown in Fig. 2, has an internal rib 8 at its outer edge, which laps over the rim 2, and forms an abutment against which the split rim 9 may bear, the said rim being arranged between the flange 5 and the retaining ring 6.

The split rim 9 has upstanding inclined flanges at its side edge, and the casing 10 has the usual holding ribs at its side edges, which are engaged by hooked or flanged retaining rings 11. These rings fit against the inclined flanges of the rim 9, and hook over the retaining ribs of the casing to hold the same in place, and the said rings are arranged upon the rim when it is collapsed as shown in Fig. 9, after which the rim is expanded, thus securing the retaining rings and shoe in place.

A series of coil springs 12 is arranged within the casing between the same and the split rim. Each of these springs is engaged at one end by a holding lug 13 on the split rim, and at the other by a holding lug 14 on a shoe 15, a series of which is arranged within the casing at the outer ends of the springs. These retaining lugs 13 and 14 are merely tapering bosses on the shoes and the rim, and the ends of the coil springs engage about the lugs.

Each of the shoes 15 is curved transversely to fit the contour of the casing, and each shoe has intermediate its ends an inwardly extending stirrup 16. At each end, each shoe has an inwardly extending lug 17, the said lugs being channel shaped and arranged with the channels facing toward each other. Sectional housing rings 18 are arranged at the opposite sides of the springs, between the same and the edges of the casing, and the sections of the rings are connected at their abutting ends by the connectors 19 shown more particularly in Fig. 3. Each of these connectors is a loop formed by bending a suitable strip of metal and riveting the ends together, and the said loop is engaged by pins 20 which are passed through the registering sections at the joint, each pin being engaged with a pair of registering sections at the opposite side of the joint.

The rings are spaced apart by the spacers shown more particularly in Fig. 8. Each of these spacers consists of a substantially triangular loop 21 formed by bending a suitable strip of material and securing the ends together, and the spacers are held by pins 22 engaging the sections of the rings. Each connector is arranged at a joint, that is, there are four connectors in the wheel. The spacers are arranged in alternate spaces between the springs, the spacers and the connectors being at the lugs 17 of the shoes. Thus there are eight spacers.

Buffers are arranged between the sectional rings 18 and are connected thereto, the said buffers passing through the stirrups 16. Each buffer consists of a bracket 24 having at its ends lugs 25 which are secured to the ring sections by pins 26, and the body portion of the bracket has means for holding a cushion 27 of rubber or the like which is adapted to engage the body of the stirrup when the shoe moves outwardly beyond a predetermined point, to cushion the outward movement of the shoe.

The tire is assembled by placing the springs, the sectional rings 18 and the shoes while the rim 9 is collapsed. The casing is then placed, together with the retaining rings 11, after which the rim 9 is expanded. Mechanism is also provided for holding the retaining rings 11 in place until the rim 9 has expanded. The said mechanism, as shown in dotted lines in Fig. 1, consists of a series of clamps, each comprising a substantially U-shaped member 28 consisting of a body adapted to extend transversely of the tire and arms extending laterally from the body on opposite sides of the tire. One of the arms has an inwardly extending lug which engages one of the rings 11, and a screw is threaded through the other arm to engage the other ring. As soon as the rim is expanded it will hold the rings in place.

Referring to Fig. 1, it will be noticed that each of the sectional rings 18 has an external rib 29 near its lower edge, and the said ribs engage similarly shaped grooves in the holding ribs of the casing.

A shield 30 of flexible material is arranged between the shoes 15 and the casing 10, the said shield being of leather or the like for receiving the wear of the shoes. The pins 20, 22 and 26 have their ends reduced as shown in Fig. 1, to form annular shoulders between the bodies of the pins and the sectional rings 18, and it will be obvious that the said pins will assist in spacing the sectional rings.

If desired, the shoes may be provided on their outer faces with longitudinally extending ribs 31, as shown on the shoe 32 in Fig. 6. These ribs engage within the material of the casing 37 to prevent lateral displacement of the shoes. The shoe is otherwise the same as that shown in Fig. 1, having the stirrup 16ª corresponding to the stirrup 16. The sectional rings 18ª corresponding to the rings 18 of Fig. 1 do not have the ribs 29, engaging directly against the holding ribs of the casing. The construction is otherwise the same as that shown in Fig. 1.

It will be noticed that the springs 12 are arranged in pairs, one pair for each shoe, and that the members of each pair are arranged on opposite sides of the stirrup.

In Figs. 10, 11 and 12 is shown the arrangement for preventing lateral movement of the shoes with respect to each other. In this construction the shoes 15 have notches or recesses 41 at their ends, which are adapted to be engaged by a depending lug 42 on a thin curved plate 43 which laps over the adjacent ends of the shoe, with the lug 42 depending into the notches or recesses 41 of adjacent shoes. With this arrangement the shoes cannot move laterally with respect to each other at their adjacent ends.

In Fig. 13 is shown an arrangement for holding the spring retaining lugs on the rim and independent of the rim. With this construction a thin metal band 44 is provided, adapted to fit tightly around the rim and the said band is provided at spaced intervals with openings through which rivets 45 are passed. Outside the rim each rivet is encircled by a tapering sleeve 46, and these sleeves are adapted to engage within the inner ends of the springs 12 to properly space the said inner ends of the springs. The band may be arranged upon the rim in any suitable or desired manner.

In Fig. 14 is shown a modified construction of rim and casing. This rim, instead of being provided with flanges, as shown in Fig. 6, for the retaining rings 11, has grooves 48 for receiving the side edges of the shoe or casing 49. This shoe or casing has reinforcing wires 50 in its side edges which hold the said edges tightly in the grooves 48.

I claim:

1. A wheel of the character specified, having a rim, a casing, and means for connecting the casing to the rim, cushioning mechanism within the casing and comprising pairs of coil springs arranged radially to the wheel, a shoe for each pair of springs, each shoe being curved to fit the inner face of the casing, and having radially extending lugs at its ends, a pair of sectional housing rings within the casing, said rings being at opposite sides of the springs, and the corresponding sections of the rings being detachably connected together in spaced relation, each shoe having between the pair of springs adjacent thereto an inwardly extending stirrup, and a resilient buffer held between the holding rings at each stirrup and extending through the stirrup.

2. A wheel of the character specified, having a rim and a casing, and means for connecting the casing to the rim, cushioning mechanism within the casing and comprising pairs of coil springs arranged radially to the wheel, a shoe for each pair of springs, each shoe fitting the inner face of the casing, housing rings at the opposite sides of the springs within the casing, each shoe having a stirrup intermediate the pair of springs adjacent thereto, and the housing rings supporting a buffer at each stirrup extending through the stirrup.

3. A tire consisting of a casing, a split rim, and means for connecting the casing to the rim, pairs of coil springs arranged radially within the casing, a shoe for each pair of springs and fitting the inner face of the casing, each shoe having an inwardly extending stirrup between the springs, housing rings at the opposite sides of the springs within the casing and supporting buffers extending through the stirrups for limiting the outward movement of the shoes.

4. A tire consisting of a casing, a split rim, and means for connecting the casing to the rim, pairs of coil springs arranged radially within the casing, a shoe for each pair of springs and fitting the inner face of the casing, housing rings at opposite sides of the springs, means in connection with the housing rings and the shoes for limiting and cushioning the outward movement of the shoes, said housing rings being sectional, means for connecting and spacing the adjacent sections of the rings, and means for connecting the abutting ends of the pairs of registering sections.

5. A tire consisting of a casing, a split rim, and means for connecting the casing to the rim, pairs of coil springs arranged radially within the casing, a shoe for each pair of springs and fitting the inner face of the casing, housing rings at opposite sides of the springs, and means in connection with the housing rings and the shoes for limiting and cushioning the outward movement of the shoes.

6. A tire consisting of a casing, a split rim, and means for connecting the casing to the rim, pairs of coil springs arranged radially within the casing, a shoe for each pair of springs and fitting the inner face of the casing, housing rings at opposite sides of the springs, means in connection with the housing rings and the shoes for limiting and cushioning the outward movement of the shoes, and means for preventing lateral movement of the shoes with respect to each other at their adjacent ends.

LE ROY B. CARRIS.

Copies of this patent may be obtained for five cents each, by addressing the "Commissioner of Patents, Washington, D. C."